Figure 1:
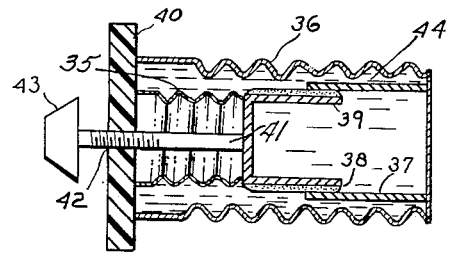

July 26, 1955 — D. B. PECK — 2,714,184
HERMETICALLY SEALED ADJUSTABLE DEVICES
Filed Aug. 21, 1951

DAVID B. PECK
INVENTOR.

BY Arthur J. Connolly
HIS ATTORNEY

United States Patent Office 2,714,184
Patented July 26, 1955

2,714,184

HERMETICALLY SEALED ADJUSTABLE DEVICES

David B. Peck, Williamstown, Mass., assignor to Sprague Electric Company, North Adams, Mass., a corporation of Massachusetts Application August 21, 1951, Serial No. 242,870

4 Claims. (Cl. 317—245)

This invention relates to improved hermetically sealed adjustable devices and more specifically refers to hermetically sealed, fluid filled variable electrical devices for use over a wide temperature range. This application is a continuation-in-part of my copending application, Serial Number 107,802, filed July 30, 1949, now Patent No. 2,575,726, granted November 20, 1951.

In the past, many fixed devices sensitive to corrosion, humidity, etc., have been hermetically sealed in containers with the use of glass-to-metal seals and the like. For example, electrical capacitors, resistors and transformers have been sealed in metal cans with glass or ceramic terminal studs. Adjustable devices, such as resistors or capacitors, particularly when filled with liquid impregnants, have been sealed with lesser degrees of success. Rotary seals, such as provided by compressed rubber or other bearing rings do not provide a true hermetic seal and will leak liquid upon temperature and/or hydraulic pressure changes.

Vacuum type variable capacitors may be sealed with the use of a bellows for adjusting the overlap between capacitor electrodes. With gases under normally atmospheric or high pressure, or with liquid fluids, this arrangement is unsatisfactory since temperature changes alter the bellows setting or cause rupture of the container, due to development of high fluid pressures.

It is an object of the present invention to overcome the foregoing and related disadvantages. A further object is to produce new and improved hermetically sealed adjustable electrical devices. A still further object is to provide a novel hermetically sealed liquid filled variable capacitor which can be very adequately adjusted. Additional objects will become apparent from the following description and claims.

This invention is primarily concerned with a movement ratio control device whose operation is dependent upon a relation existing between the diameters of separate control and compensating bellows. The latter are usually, though not necessarily, arranged in a co-axial manner. Two movable elements are adjusted in a controlled ratio as follows: one element is connected to the control bellows while the other element is affixed to the compensating bellows. If the control bellows is expanded, for example, by use of a screw actuated drive, the first element moves laterally toward the second element. However, as this bellows expands, the encased volume tends to decrease, causing an increased hydraulic pressure. The compensating bellows is thereby caused to expand, to again reach the equilibrium volume and hydraulic pressure values. As it expands, the second element, attached to it, is drawn laterally away from the first element. The relative net movement between the two elements is therefore dependent upon some more or less fixed relation between the two bellows.

This relation may be expressed in the following manner: $d$ and $D$ represent the average diameters of the control and compensating bellows, respectively, and $h$ and $H$ represent the gross movements of these same respective bellows. If the hydraulic pressure level within the assembly is to be held at a uniform value, a volume change effected by a movement of the control bellows must be equalled by a volume change in the compensating bellows, as follows $$\frac{d^2 h}{4} = \frac{D^2 H}{4}$$

which reduces to provide the relation $$\frac{h}{H} = \frac{D^2}{d^2} \text{ or } H = \frac{hd^2}{D^2}$$

The net movement between elements controlled by the two bellows is equal to $h$–$H$, which can be expressed as $$h - \frac{hd^2}{D^2}$$

and the movement ratio may be referred to as the net movement, above, divided by the gross movement $h$ of the control bellows, e. g.

$$\text{Ratio} = \frac{D^2 h - d^2 h}{D^2 h}$$

or $$\frac{D^2 - d^2}{D^2}$$

Thus, for high ratios and very sensitive movement or adjustment control, such a device will employ similar (but necessarily different) bellows diameters. For more direct ratios (approaching or equal to 1) the compensating bellows diameter may be made very large compared to the control bellows diameter.

It is apparent that ratios greater than 1 may be achieved by operating the device "backwards," that is, with the control bellows having a larger diameter than the compensating bellows.

The bellows themselves may be of metal or, in certain limited cases, of plastic material, so formed as to maintain a uniform shape and action, such as polytetrafluoroethylene, polyamides and the like. For most purposes, bellows may be constructed of the following metals and alloys: brass, bronze, steel, Monel metal, nickel alloys, copper, beryllium copper, platinum, etc. The particular metal and design selected depends in part upon the flexibility required, fluid mediums in contact with the bellows, number of flexures normally expected, etc. Multiple ply bellows may be employed.

The variable devices of this invention are particularly useful in the manufacture of hermetically sealed adjustable electrical capacitance, resistance and/or inductance elements. Particularly small devices can be made with co-axial electrical elements, such as capacitors and slug-tuned coils. In certain instances, the bellows elements themselves may serve as electrically active portions, that is, either as capacitor electrodes or as cores for controlling field permeability and/or intensity of cylindrical coils. The bellows may also be utilized to serve as resistance elements, by means of a contact fastened on one bellows sliding along the second bellows.

The fluid fillant may be a gas or a liquid. The invention is particularly applicable for liquids and for gases under high pressure. In the case of electrical assemblies, the fillant, if gaseous, is advisably under high pressure to secure the highest breakdown voltage level. Further, the compressibility of the gas must be substantially less than the extensibility of the compensating bellows, in order that consistent results are obtained. Use of the invention permits maintenance of high pressures within a general range without rupture of the hermetic seal. As gaseous fillants, I mention sulfur hexafluoride, octofluoropropane, decafluorobutane, nitrogen and similar materials. Typical liquid fillants are hydrocarbon oils, liquid polymers of the hydrolysis products of aryl, alkyl and aralkyl chlor silanes, known commercially as the silicone oils, perfluorohydrocarbons, perfluoro aliphatic amines, etc. In the preparation of hermetically sealed variable capacitors, I prefer to use materials with low surface tension, as represented by the perfluoroaliphatic amines.

Figure 2:
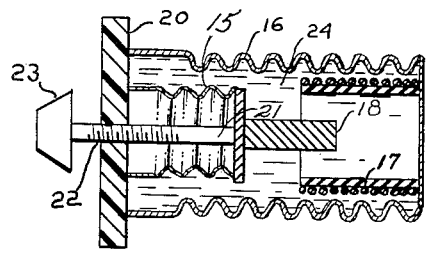
Figure 3:
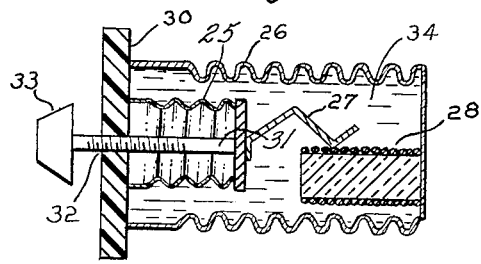

For further discussion of the invention, reference will be made to the drawings, in which Figure 1 represents a schematic sketch of a hermetically sealed condenser according to this invention; Figure 2 shows a sealed slug-tuned coil; and Figure 3 represents a variable resistance element.

Referring now to Figure 1, a ratio drive condenser is shown. Here, substantially rigid base plate 40 is an annular element upon which is mounted compensating bellows 36 and control bellows 35. A cylindrical capacitor electrode 39 with a dielectric coating 38 on its outer surfaces is mounted on the inside of the closed end of bellows 35. This electrode slide fits within cylindrical sleeve electrode 37, which is mounted on the inside of the closed end of bellows 36. Movement of electrode 39 is effected by turning of threaded drive shaft 41 which passes through threaded yoke 42 and is provided with knob 43. Dielectric liquid 44 fills the assembly.

As drive shaft 41 is moved along the axis of the assembly, moving control bellows 35, compensating bellows 36 is also moved to maintain hydraulic equilibrium. As previously explained, the net absolute movement of electrode 39 with respect to electrode 37 is in a ratio of $$\frac{D^2 - d^2}{D^2}$$

with the movement of shaft 41, where $D$ is the compensating bellows effective diameter and $d$ is the control bellows diameter. Thus if the diameters $D$ and $d$ were 1.5″ and 1.0″, respectively, the absolute electrode displacement would be about 0.56″ for every inch that shaft 41 and bellows 35 moved.

Obviously a great deal of change may be made in the extract electrode sleeve structure shown in Figure 1. For example, either or both of the cylindrical electrodes 37 and 39 may be replaced with dielectric cylindrical bodies which have been silvered or otherwise metallized on separated surfaces. Very compact condenser structure may be formed in the indicated manner with the electrodes surrounding the inner bellows, instead of at the end of this bellows as shown in Figure 1.

In Figure 2 the same ratio control drive is used with a slug-tuned coil. In this device the bellows 15 and 16 are mounted upon a substantially rigid base plate 20 through which projects a control shaft 21 threaded at 22 and driven by the handle 23. By turning this handle it is possible to vary the position of a permeable slug 18 of iron, ferrite, or other similar material within the coil 17.

The same general variety of control device is seen in Figure 3 where it is used with variable resistance unit. Here the bellows 25 and 26 are positioned upon a substantially rigid base plate 30. The shaft 31 projects through this plate and is controlled in relation to it by means of the threaded portions 32 and the handle 33. Contact wires 27 are positioned within the space 34 between the two bellows, and are in direct electrical connection with the resistance windings 28.

It is also possible to produce a variable device in which the ratio can be continuously varied without internal modification. This may be accomplished by employing one of the bellows, usually the outer bellows, in which the bellows diameter changes from convolution to convolution. Such a bellows may then be provided with a wire which may be threaded on to the convolutions preventing compression of those against which it abuts. This adjustable bellows is also useful for temperature compensation and the position of the wire can be calibrated for adjustment purposes.

As many different embodiments of this invention may be made without departing from the spirit and the scope thereof, it is to be understood that the invention is not limited to the specific embodiments hereof except as defined in the appended claims.

What is claimed:

1. A new and improved variety of hermetically sealed electrical device which comprises a wall having front and back sides, a first bellows means dependent from the back side of said wall, said bellows structure having the general shape of a cylinder, first sealing means sealing the portion of said bellows removed from said wall, a second bellows means having the general shape of a cylinder dependent from the back side of said wall within said first bellows means, second sealing means sealing the portion of said second bellows means removed from said wall, a first electrical component portion attached to the first sealing means, a second electrical component portion attached to the second sealing means, said first and said second electrical component portions cooperating to provide an adjustable electrical circuit component, a fluid dielectric means insensitive to atmospheric pressure changes filling the space between said first and second bellows means, said wall and said first and second sealing means, adjusting control means positioned on the front side of said wall and projecting through said wall into the area enclosed by said second bellows means, and attached to adjust the position of one of the sealing means with respect to said wall and to simultaneously cause the difference in bellows sizes to effect through the fluid a somewhat different amount of movement of the other sealing means so that the electrical circuit component is automatically adjusted in proportion to the amount represented by the movement of the adjusting control means alone.

2. An electrical device as defined in claim 1 wherein the fluid is a liquid, said first electrical component portion includes one electrode of a capacitor, and wherein said second electrical component portion includes a second capacitor electrode, and the assembly includes a capacitor dielectric.

3. A device as defined in claim 1 wherein the fluid is a liquid, one of said electrical component portions includes an electrical coil and wherein the other electrical component portion includes a permeability-changing element positioned with respect to said coil so as to vary the inductance of said coil in response to motion of said adjusting control means.

4. A device as defined in claim 1 wherein the fluid is a liquid, one of said electrical component portions includes an electrical resistor and wherein the other electrical component portion includes a sliding contact connected for adjustable positioning against said resistor by said adjusting control means.

References Cited in the file of this patent

FOREIGN PATENTS 589,728     Great Britain _____ June 27, 1947